United States Patent [19]

Nebolsine

[11] 4,128,477

[45] Dec. 5, 1978

[54] METHOD FOR THE TREATMENT OF SEA DISCHARGED SEWAGE

[75] Inventor: Rostislav Nebolsine, New York, N.Y.

[73] Assignee: Hydrotechnic Corporation, New York, N.Y.

[21] Appl. No.: 793,846

[22] Filed: May 5, 1977

[51] Int. Cl.² .............................................. C02B 1/34
[52] U.S. Cl. ...................................... 210/50; 210/54; 210/62; 210/63 R; 210/63 Z; 210/170
[58] Field of Search ..................... 210/50, 66, 78, 73 S, 210/62, 63 R, 63 Z, 82, 67, 65, 51, 52, 15, 18, 8, 60, 195 R, 196, 198 R, 199–202, 206, 259, 279, 293, 170, 260

[56] References Cited

U.S. PATENT DOCUMENTS

| | | | |
|---|---|---|---|
| 3,276,994 | 10/1966 | Andrews | 210/66 |
| 3,470,091 | 9/1969 | Budd et al. | 210/170 |
| 3,512,649 | 5/1970 | Nebolsine et al. | 210/279 |
| 3,568,838 | 3/1971 | Appelgren et al. | 210/170 |
| 3,577,341 | 5/1971 | Keith, Jr. et al. | 210/202 |
| 3,638,590 | 2/1972 | Roberts et al. | 210/67 |
| 3,671,022 | 6/1972 | Laird et al. | 210/170 |
| 3,792,773 | 2/1974 | Ross | 210/82 |

Primary Examiner—Thomas G. Wyse
Assistant Examiner—Benoit Castel
Attorney, Agent, or Firm—Darby & Darby

[57] ABSTRACT

Disclosed herein is a method for treating sewage destined for discharge into the sea. The fluid treatment process comprises conducting the sewage through bar racks, and degritters to remove large scale particles, extracting intermediate size particulate material in a rotary drum screen, introducing a chemical composition into the fluid to promote coagulation of particles having an average particle size of less than about 1 micron, filtering the fluid containing said coagulated particles through a deep bed multi-media filter, adjusting the quantity of dissolved oxygen in the filtrate to a predetermined level and discharging the oxygenated fluid to the sea some distance offshore to permit dispersal of any remaining contaminants by action of wind and currents.

12 Claims, 1 Drawing Figure

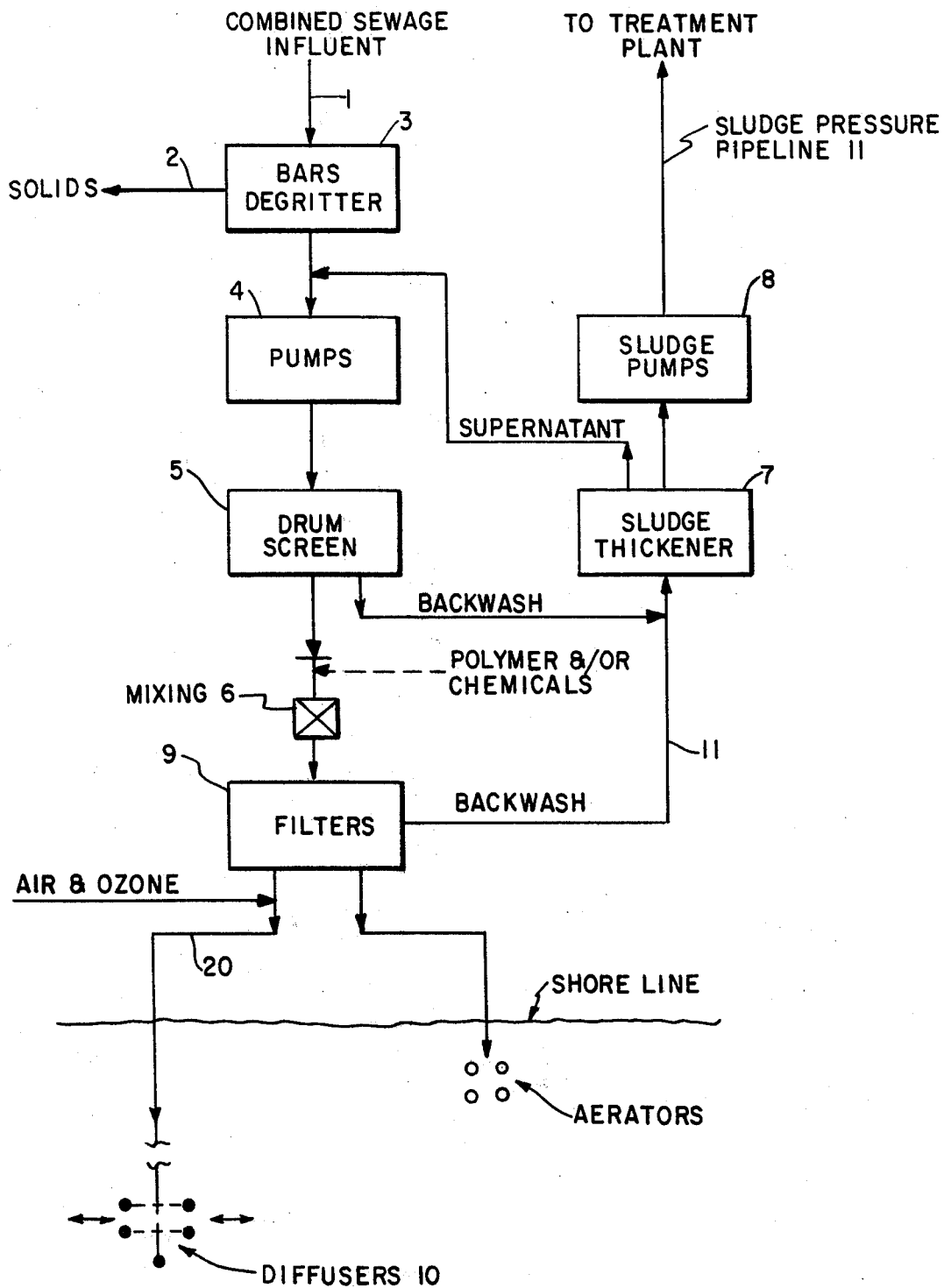

METHOD FOR THE TREATMENT OF SEA DISCHARGED SEWAGE

This invention pertains to a method for treating waste water discharges. More specifically, the invention relates to a method for treating sewage which is to be discharged to the sea. Still more specifically, the invention pertains to a method for treating sewage and waste water to remove suspended solids and oils which menace the survival of edible marine species and to reduce the amount of BOD components in such fluids to predetermined levels.

In general, sea coast cities have done less with respect to the treatment of sewage than have inland communities. The disposal technique employed by many such cities consists of conducting the sewage fluid to an outfall or discharge portal located a considerable distance from the shore. In many instances the sewage released into the sea through the off-shore outfall has not received any primary treatment or screening. While considerable attention has been devoted to locating the outfalls and directing the waste streams away from the shore line, thus giving a degree of protection to the coastal environment, unpredictable changes in winds and currents can lead to the fouling of beaches and pollution of coastal waters. Recently, as a result of numerous scientific investigations, there has been a widening movement to halt pollution of the seas.

Most sewage quality standards are directed to safeguarding the sources of potable water. Many of these standards are not necessary for controlling the composition of discharges to the sea. Thus, dissolved inorganic solids such as chlorides, sulfates, carbonates and phosphates may be present in greater concentrations in sea water. On the other hand, suspended solids, oils and greases, and certain toxic heavy metals (e.g., lead, cadmium and cobalt) must be removed in order to prevent pollution of the littoral and to protect the quality of coastal waters. Recent standards provide that water discharged to the sea must be essentially free of (1) material that is floatable or will become floatable upon discharge;

(2) settable material or substances that form sediments which degrade benthic communities or other aquatic life;

(3) substances toxic to marine life due to increases in concentrations in marine waters or sediments;

(4) substances which significantly decrease the natural life to benthic communities and other marine life; and (5) materials which result in aesthetically undesirable discoloration of the ocean surface.

The hitherto available sewage treatment systems have drawbacks which render them generally too expensive for discharge of treated materials to the sea.

Conventional primary sewage treatment is based on some form of gravity separation. While such systems are successful in removing large-scale materials from the sewage stream, they only remove about 30 to 45% of the suspended solids. This means that the treated effluent in most instances will contain between about 275 and 350 milligrams per liter of suspended solids. This greatly exceeds the 50 to 75 milligrams per liter of suspended solids generally considered to be permissable for introduction to the sea.

While by itself microstraining can be effective in removing 25–50% suspended solids, it must be preceded by coarse screening or primary treatment in order to reduce clogging of the fine mesh screens and excessive wear and abrasion. Moreover, the removal of slime and biological growths which accumulate on the strainer is not easily accomplished and requires the use of expensive solvents.

Conventional secondary sewage treatment is usually based on some form of bio-oxidation (e.g. bacterial degradation) or physio-chemical process. The effluent produced from such systems generally meets recently enacted standards for sewage discharges to the sea. However, secondary sewage treatment plants have several drawbacks. The cost of construction and operation for secondary treatment facilities is extremely high. Moreover, such plants require a large site near the coast where land is particularly expensive. Most communities are not willing to accept location of a secondary sewage treatment plant in highly developed neighborhoods adjacent to the coastline. The alternative to coastal siting, conveying the sewage inland for secondary treatment and then conducting the treated effluent back to the shoreline for disposal to the sea, tends to increase the already high construction and operation costs. A more significant drawback is that the removal of contaminants by bio-oxidation processes is easily upset by several factors, many of which cannot be easily controlled. This requires a reserve capacity for treatment and storage which in turn calls for additional space.

The foregoing problems are overcome by the present invention in which heavy debris and relatively dense suspended materials are removed by conducting the effluent steam through bar racks and degritters, subjecting the effluent to narrow-range screening, admixing a coagulant composition with the effluent to promote agglomeration of microscopic suspended solids into particles having an average mean particle size between about 1 and about 70 microns, removing said agglomerated particles from the effluent screen by filtration through an ultra-high rate water filtration apparatus to produce a filtrate containing from about 50 to about 75 milligrams per liter of suspended solids, introducing oxygen, air or ozone into said filtrate to raise the level of dissolved oxygen and discharging the oxygen treated filtrate to the sea. Effluent from the process generally complies with recently enacted standards for sewage discharge to the sea. This procedure overcomes most of the drawbacks of the prior art since it can remove the principal contaminants, including suspended solids, floating particles, settleable solids, grease, oil, heavy metals and turbidity to the same degree as conventional secondary sewage treatment, but at less than half the cost. The area occupied by a treatment plant capable of practicing the process is less than 20% of that required by a conventional secondary treatment plant of equivalent capacity. Moreover, the total elapsed time for treatment required by the instant process is less than 15 minutes, as contrasted with the 5 to 8 hours required to achieve comparable contaminant levels in conventional secondary treatment plants. Although the process requires addition of coagulants and other chemicals to the fluid to be treated, the relatively low dosages involved require an expenditure equal to only 10 or 20% of the cost of chemicals or energy required for conventional secondary sewage treatment processes which usually call for the use of activated carbon. As a further benefit the instant process has a total energy requirement of about 0.2 kilowatt hours per cubic meter of treated sewage, considerably less than the corresponding figures for conventional bio-oxidation treatment processes.

The ultra high rate filtration apparatus (essentially a deep bed multi-medium filter) can operate at rates of flow substantially above the design criteria for short periods of time. Accordingly, it is possible to treat periodic "flush" flows resulting from storm run offs. Also of importance is the fact that the entire process is compact and can be housed in a small completely enclosed building which does not have an adverse aesthetic impact upon the surrounding coastal areas.

It is accordingly an object of the present invention to provide an efficient process for treating sewage to be discharged to the sea.

Another aspect of the invention is to provide a sewage treatment process which is substantially less expensive to construct and operate as contrasted with conventional secondary sewage treatment systems.

A further aspect of the present invention is to provide a process for the treatment of sewage destined for discharge to the sea which can remove suspended solids, floating particles, settleable solids, grease, oil and heavy metals to the same degree as conventional secondary treatment and which occupies a substantially smaller area than that required by a secondary treatment plant of equivalent capacity.

A still further aspect of the present invention is to provide a rapid system for the treatment of sewage to be discharged in the sea.

These and other aspects of the present invention are more completely explained by consideration of the following description of a preferred embodiment of the invention described with reference to the accompanying drawing in which FIG. 1 is a schematic diagram indicating the flow of influent sewage through the process of the invention.

The present invention will be described by reference to treatment and disinfection of a sewage influent stream containing suspended inorganic and organic solids, oils, greases, and heavy metals including for example sand, cinders, metal filings, and dissolved solids such as chlorides, sulphates, carbonates, phosphates and the like. Heavy metal contaminants such as lead, mercury, nickel and zinc, as well as other toxic metals including arsenic, cadmium, chromium, copper; poisons including cyanide, and hydrocarbons including for instance phenolic compounds and chlorinated hydrocarbons which are primarily of industrial origin should not be present in the influent in ecologically harmful quantities as they should be intercepted and treated at their source. The sewage influent is considered to be representative of that produced by a typical coastal city comprising a mixture of residential and industrial citizens.

The topography of most coastal cities results in all waste streams being directed towards the sea. The streams are generally intercepted and conveyed to a small central processing plant which is completely housed in a well ventilated structure having an architectural design which blends with its seaside location and does not depress the value of adjacent properties. If the city has a combined sewer and storm drain system, the hydraulic capacity of the sewage treatment plant of the present invention can briefly handle 200% or even more of its design (dry weather) capacity which will afford satisfactory treatment for the dirtiest portion of storm run off. This allows the treatment of the first flush of a combined storm sewer-sewage system.

Referring to the FIGURE of the drawing, the combined sewage influent (1) received at the treatment plant via the sewer system is first conducted through a sewage treatment arrangement (2) including bar racks or bar screens and a degritter (i.e. grit separator). Bar assemblies are usually arranged in racks or screens constructed of steel bars assembled within a steel frame. These assemblies which are well known to the art have bar spacing designed to provide a clear opening range from a minimum of about ½ of an inch to 2 inches or more to meet the specific requirements of a particular influent situation. In most instances the bar rack is equipped with a cable operated cleaning rake to enable positive cleaning of the bars. In operation, the bar rack or screen intercepts the heavy debris carried with the intake flow such as fish, ice, branches, rags, mattresses, cans, bottles and the like from the influent flow. This debris, accumulated on the bar screen, is removed by operation of the rake.

The sewage flow is then conducted into a conventional degritter arrangement in which the more dense suspended materials (e.g. sand, cinders, and metal filings) are removed by differential settling; i.e. by retarding the fluid flow to a relatively slow velocity (about one to three feet per second) in a separation tank or channel. This permits the higher specific gravity solids to settle out in the channel while the lighter solids remain in suspension. If not removed at this stage, the grit entrained with the sewage flow can damage pump mechanisms and clog screens and filters encountered in subsequent processing operations. Furthermore, failure to remove grit can result in its accumulation in sewage digesters if these are used. Recovery of grit from digesters is extremely expensive and likely to interfere seriously with the sludge disgestion procedure. Practice of the present invention is not limited to any particular degritting arrangement and any of the degritting devices well known in primary sewage treatment are satisfactory for use in the instant process. Such devices include channel-type grit chambers having an elongated and rectangular plan of the cross-section or outlet arrangements such that a fairly constant velocity can be maintained with a normal flow limit.

Depending upon the site location, the sewage effluent emerging from the primary treatment phase 3 is then raised to a height of about ten meters above ground level in order to provide a hydraulic head for further treatment by gravity. In most instances the lifting operation will be accomplished using pumps 4; however, processing operations conducted in suitable geographic locations may take advantage of natural terrain features to obtain the necessary hydraulic head. Thus, in those instances where the processing operation is located on a hillside, the influent sewage stream may enter at the highest point for passage through the bar screens and degritters, and proceed downhill for the remainder of the processing operation thereby eliminating the requirement for a pumping operation.

The sewage effluent which has been lifted by pumps 4 is then subjected to narrow range screened preferably in a revolving drum screen apparatus. The raw sewage enters the revolving drum screen 5 through an inlet port on the upstream side of the unit. The revolving screen is of conventional design and operates on the center flow principle in which liquid enters the center of the screen, passing from inside to the outside of the screening baskets. Thus, the entire submerged screening area is utilized to permit effective filtration. Accumulated trash and debris are conveyed to the top of the screen and discharged by gravity into a screening trough. In the present invention, the screening media is a steel screen between No. 20 and No. 60 mesh (No. 20 mesh being equal to 2 squares per inch, and No. 60 mesh being equal to 60 squares per inch).

The screen size is of some importance, as sizes smaller than 60 mesh have been found to be subject to the same difficulties as in microstraining, while sizes larger than 20 mesh provide only coarse screening which would not prevent passage of large scale particles to the filter media.

The liquified sewage is preferably poured over the narrow range screens at a rate of 25 to 100 gallons per minute per square foot of wetted screen area. The drum screens are periodically cleaned by a backwash water shower which is discharged vertically downward into the screening trough. The narrow range screening is primarily designed to remove smaller scale solid and stringy materials (i.e., paper fibers, threads, etc.) which might clog the filter media. In general, the drum screening will remove particles which are larger than 70 microns in order to protect the ultra high rate filter media. Passage of materials having a particle size greater than 70 microns onto the filter surface would impair filter performance. Accordingly, an important aspect of the present invention is to conduct effective narrow screening operations.

Despite careful narrow range screening in the rotary drum screening apparatus, the sewage effluent from the screen will nonetheless contain a fairly high degree of suspended solids in the form of colloids, which are desirably removed prior to introduction to the filter beds. Accordingly, predetermined doses of chemical compositions which will precipitate colloids into a soft mass or lead to formation of flocculant precipitates are introduced into the sewage effluent after it emerges from the narrow range screening operation. Suitable chemical compositions for use in effecting coagulation and flocculation of colloidal suspended solids within the sewage effluent include inorganic metal salts, natural and synthetic organic polymers and combinations of the preceding ingredients. Inorganic salts which may be used as flocculants or precipitants include alum, e.g., ammonium sulphate of the general formulae $M_2' SO_4 \cdot M_2''' - (SO_4)_3 \cdot 24 H_2O$ or $M'M'''(SO_4)_2 \cdot 12H_2O$, wherein $M'$ is monovalent and may be Na, K, Rb, Cs, $NH_4$, Tl or Ag, and $M'''$ is trivalent and may be Fe, Cr, Al, Mn, In, Tl, Ga, V, Co, Ti, or Rh. $SeO_4$ may replace $SO_4$. Also useful are double salts of aluminum sulphate and the sulphate of the preceding monovalent metals. Especially preferred as a coagulant additive is ammonium alum $(NH_4)_2 SO_4 \cdot Al_2(SO_4)_3 \cdot 24 H_2O$. Generally, satisfactory coagulation and precipitate formation can be achieved by the addition of between about 0.5 and about 15 milligrams per liter of sewage of the preceding aluminum sulphate salts.

It is especially preferred to use moderate doses of alum in the range of 10 to 40 parts per million of sewage in the present invention.

Organic polyelectrolytes which are also useful as coagulating agents in the present invention include natural and synthetic anionic, cationic and nonionic organic polymers. Such polymers may be categorized as those capable of producing large chain-type ions in solutions and capable of carrying positive or negative groups along the polymer chain. These materials are generally classified as polyelectrolytes, are water soluble and include polyamines, polyacrylamides, starch, sodium carboxy methylcellulose, ethyleneoxide polymers, carboxyl polymers, polyacrylic acid, polyacrolates of sodium or ammonium, polyamines, sodium alginate, and alkyl guanideamine complexes. One preferred material is the sodium salt of a water soluble acrylic polymer (available as Cyanamer 370 from American Cyanamide Company). An equally suitable material is an anionic polyacrylamide formed by the copolymerization of acrylamide and acrylic acid (available from American Cyanamide as Accurac 24).

In most instances introduction of between about 0.25 and 1.0 milligrams per liter sewage of organic polyelectrolyte provides satisfactory coagulation. In some instances it may be desirable to introduce both alum and one or more polyelectrolytes to a particular sewage effluent in order to obtain optimum precipitation and flocculation of suspended particles. Under these circumstances the amount of each chemical additive introduced to the sewage stream will have to be adjusted to provide desirable results. It is also possible to recirculate the backwash after settling through the filters to take advantage of the remaining active electrolytes. The sludge can be collected and disposed of separately. To minimize the cost of sewage treatment, it is desirable to use the smallest quantity of polyelectrolytes and/or alum per liter of sewage effluent consistent with achieving optimum coagulation and flocculation of suspended colloidal materials.

In operating the present invention the coagulating chemicals are generally introduced into a mixing basin 6 to which the sewage effluent from the drum screens 5 has been conducted. The overflow from the drum screens is conveyed to a conventional sludge thickener device and then via sludge pumps 8 and a sludge pressure pipeline 11 to a treatment plant for further refinement. The liquid overflow from the sludge thickener 7 may be fed to the primary treatment arrangement 3 of the present invention to promote better grit separation and flow characteristics. In order to avoid disturbing the aesthetic and environmental amenities of the coastline, the sludge is pumped through a small diameter underground pressure pipeline to an inland site where it can be digested and disposed of in an economical fashion. The drum screens 5 and filters 9 are backwashed with water at periodic intervals to cleanse them of accumulated contaminants. The backwash from the drum screens 5 and high rate filters 9 is generally conducted along pipeline 11 and carries up to 90% of all the contaminants removed by the instant invention.

Both alum and polyelectrolyte organic chemical compositions may be added directly to the sewage in the mixing basin or device 6 to assure maximum dispersion of these coagulants in the liquid. Polyoelectrolytes are preferably added to the effluent stream beyond the mixing basin to avoid the possibility that the mixing action may result in breaking up the relatively long polymer chains into smaller components, thereby depriving them of their action as flocculating agents. However, alum is preferably introduced into the effluent stream at a point before the stream enters the mixing basin. This affords additional opportunity for admixture of the alum constituent with the sewage. The coagulation operation agglomerates small particles having an average size less than 1 micron to form particles having a size in the range between about 1 micron and 70 microns. Efficient coagulation is an important aspect of the present invention since particles having a size below 1 micron might not be trapped in the ultra high rate filtration apparatus 9 and could escape to the sea. Introduction of the coagulating chemical compositions results in coagulation or flocculation of inorganic and organic solids suspended in the sewage effluent. In addition, heavy metals which may be present in the effluent, e.g., phosphorus are precipitated by the addition of alkaline materials (e.g., lime) to larger particle sizes which are easily entrapped on the filter media during subsequent processing operations.

In contrast to prior art techniques, the sewage treatment system of the present invention does not require a separate settling tank or basin into which coagulated and flocculated materials are delivered for settling. Instead, after introduction of the chemical coagulating compositions the sewage effluent is led directly from mixing apparatus 6 into the ultra high rate filtration apparatus 9.

The sewage is delivered in a suitable pipe or conduit from the inline mixer 6 directly to the ultra high rate filters 9. The ultra high rate filters of the present invention are designed to treat water or other liquids containing a concentration of suspended matter on the order of from 20 to 500 milligrams per liter at extremely high filtration rates of from about 10 to about 90 gallons per minute per square foot of filter area. In simplified terms, such filters accomplish filtration in depth and remove contaminants from the fluid screen, at least in part, by physical absorption on the surfaces of the filter media granules.

The high rate filters usually employ a plurality of overlying media beds. Each filter consists of two or more beds of relatively coarse media, the composition and size of the respective beds differing from each other in contrast to prior art filters employing a single filtration medium. Because the combined depth of the filter beds is much greater than has been employed in the past, special backwashing facilities are provided to afford adequate cleansing of the media. In most operations the flux rate on the ultra high rate filter beds ranges from about 25 to about 80 cubic meters of average effluent per square meter of filter bed per hour. The ultra high rate filter apparatus collects the fine flock (having a particle size between about 1 and about 70 microns) which were created by addition of the coagulating chemicals to the waste stream or present as part of the untreated sewage flow. Suspended solids in most waste water discharges are reduced on the order of 90% to 98% in the filtrate.

A typical high rate filter installation for treatment of waste water generally consists of several open cells of the type used in prior art "rapid" sand filters. The uppermost filter bed having a thickness between 1½ and 4 feet may consist of pea size (i.e., 4mm average size) anthracite granules of a size between about 3 and 12mm. A second underlying bed having a thickness of 1½ to 3 feet and consisting essentially of coarse sand (e.g., 2mm average particle size) is provided. The larger particles are removed in the anthracite layer, while the smaller size ranges including finely dispersed oils are removed in the second layer. The sand and anthracite beds are supported on a filter bottom designed to permit uniform distribution of the filtrate, backwash water and air at high rates when the fluid has achieved a predetermined head loss. Ultra high rate water filtration apparatus suitable for use in the present invention is described in Nebolsine et al. U.S. Pat. No. 3,512,649, granted May 19, 1970 and Nebolsine et al. U.S. Pat. No. 3,746,172, granted July 17, 1973, the disclosures of which are incorporated herein by reference. The exact design of the ultra high rate filtration apparatus for a particular sewage treatment will be selected based upon several factors including the nature of the waste to be treated, flow rate desired, media type and depth, backwashing procedures and the affect provided by addition of particular coagulating chemicals. The finely flocked and coagulated colloidal particles having an average particle size on the order of between about 1 micron and about 70 microns created by the coagulant chemical are intercepted and retained on the ultra high rate filter beds. In a preferred embodiment of the present invention, the filtration apparatus is operated at a flux rate of between about 10 and about 40 gallons per minute per square foot of filter bed area.

The filtrate from the ultra high rate filters 9 is delivered to the outfall pipe 20, while the backwash fluid is conveyed via sludge thickener 7 and sludge pumps 8 to the sludge pressure pipeline for delivery to a treatment plant including digesting apparatus which is preferably located some distance inland.

In order to raise the level of dissolved oxygen in the filtrate prior to its introduction to the sea, it is treated with atomized air within the confines of outfall 20. The treatment is carried out by injecting atomized air at a discharge air pressure of between about 25 and 100 lbs. per square inch and preferably 50 lbs. per square inch. Thus, despite the fact that the filtrate contains some BOD contaminants, the waste water returned to the sea has a controlled content of dissolved oxygen as may be required for the surrounding sea water.

One of the basic aims of sewage treatment had always been to limit the concentration of BOD (i.e., compositions which have a Biochemical Oxygen Demand) so as not to excessively deplete the dissolved oxygen in the receiving water body. However, due to the different eccological conditions encountered in confined fresh water bodies and the open sea, it is not necessary to adopt the same stringent BOD concentration limits for discharges to the sea and higher levels can be tolerated.

Instead of air, oxygen or ozone may be injected into the sewage in the enclosed outfall pipe under pressure. Atomization of the pressurized air, oxygen or ozone may be carried out through a micro-porous body (e.g., sandstone), or a sparger, or a jet. An electrical monitor device located at the diffuser ports 10 (i.e., discharge) of the outfall pipe 20 is employed to compare the amount of dissolved oxygen in the discharge waste water with that in the surrounding sea water. If the concentration of dissolved oxygen in the sewage effluent is beneath that found in sea water, the monitor signals electrical apparatus controlling the air injection system to deliver increased quantities of atomized air to the effluent in the outfall pipe. The diffuser portals 10 are located well off shore and spaced at a considerable distance from one another along outfall pipe 20. As an optional step, the sewage may be treated with ozone or chlorine just prior to being released into the sea through the diffuser portals. Alternatively, aerators may be placed in a lagoon adjacent to the outfall to raise the concentration of dissolved oxygen in the water.

The entire sewage treatment process of the present invention requires an elasped time of between about 5 and about 15 minutes as contrasted with prior art techniques which require between 5 and 8 hours to effect complete treatment. The total land area required to house the process of the present invention is extremely small and all the required apparatus and procedures can be carried on within a well ventilated building of modest size on the order of a large single family residence. Furthermore, the process decreases the captial and operating costs for a sewage treatment plant as it has minimal energy requirements since the sewage effluent need only be lifted a maximum of about 10 meters above the level of the sewer system inlet. In most instances the process requires approximately 0.2 kilowatt hours of energy per cubic meter of treated sewage, a fraction of the corresponding figures for conventional secondary sewage treatment. A particular advantage of the present invention is the ability to inject predetermined quantities of dissolved oxygen into the sewage effluent thus insuring the presence of sufficient oxygen to enable survival of benthic communities in close proximity to the sewage outfall.

As a rule, it has been found desirable to raise the level of dissolved oxygen in the filtrate slightly above that normally present in the surrounding sea water. This will enable the survival of marine species in the area directly adjacent to the diffuser ports, despite the presence of any BOD constituents remaining in the sewage stream after treatment. The process of the invention removes between about 80 and 98% of the suspended solids (e.g., floating particles, settleable solids, grease, oil, turbidity, heavy metals and phosphates) and achieves performance equal to conventional secondary sewage treatment at less than half the construction and operational cost. Tests have confirmed that sewage plants constructed in accordance with the present invention can meet the sea water effluent quality standards recently adopted by the State of California.

What is claimed is:

1. A method of treating sewage fluid for discharge through an outfall to a body of sea water which comprises:
   removing dense suspended particulate materials from said fluid;
   passing said fluid through a fine mesh screen, which is between 20 and 60 mesh;
   introducing a coagulant composition to said fluid to promote coagulation of colloidal size particles in said fluid, said coagulant composition comprising a member selected from the group consisting of an alum composition, a polyelectrolyte, or mixtures thereof;
   filtering said fluid containing said coagulated particles through a deep bed multi-media filter to produce a filtrate essentially free of particles between about 1 micron and about 70 microns;
   detecting the presence of a lower quantity of oxygen in said filtrate than in the sea-water into which said filtrate is to be discharged by comparing the quantity of dissolved oxygen in said filtrate with the quantity of dissolved oxygen in the sea water;
   raising the quantity of dissolved oxygen in said filtrate to at least the level present in said sea-water in response to the detection of said lower quantity of oxygen by blowing an atomized oxygen containing gas under pressure into said filtrate; and
   discharging said oxygen treated filtrate to the sea-water through said outfall.

2. The method of claim 1 wherein said removing step comprises conducting said fluid through a roughing screen or bar rack.

3. The method of claim 1 wherein said removing step comprises passing said sewage fluid through a grit collection chamber.

4. The method of claim 1 wherein said coagulant is the alum composition, and said alum composition has the general formula $M_2' \ SO_4.M_2''' \ (SO_4)_3.24H_2O$ wherein M' is monovalent and is selected from the group consisting of sodium, potassium, rubidium, cesium, ammonium, tellurium and silver, and M''' is trivalent and is selected from the group consisting of iron, chromium, aluminum, manganese, indium, tellurium, gallium, vanadium, cobalt, titanium and rhodium.

5. The method of claim 4 wherein said coagulant composition is a polyelectrolyte and, said polyelectrolyte is a synthetic organic polymer containing repeating units of acrylic acid.

6. The method of claim 5 wherein said deep bed filter comprises a concrete casing formed with a first upstanding wall and coordinate walls bounding a deep industrial filter chamber and carrying at its upper side area a second upstanding wall and coordinate walls bounding a fluid-receiving chamber, said first upstanding wall having at its lower area and exterior thereof coordinate walls bounding a chamber for receiving clarified fluid, horizontally positioned distributor troughs in the filter chamber across its upper area above the filter bed and receiving fluid directly through openings in a wall of the fluid-receiving chamber first named, a floor wall in the filter chamber, means for supporting said floor wall substantially above the base of the filter chamber, a plurality of distributor blocks on the flooring and adapted to support a filter bed, said distributor blocks being formed with through-slots therein for the passage of fluid, a plurality of open-ended tubular nozzles passing through the floor wall to a distance below the same and having flow communication with the slots in the distributor blocks, a valved backwash discharge pipe extending from said fluid receiving chamber, a valved back-wash inflow pipe and also a valved outflow pipe extending from the filter chamber below its floor wall, and means for admitting jets of air to the area of the filter chamber below said floor wall thereof for agitating the filter bed during back wash thereof.

7. The method of claim 6 wherein said gas is selected from the group consisting of air, oxygen, and ozone.

8. The method of claim 7 which comprises discharging said filtrate to the sea through an outfall pipe having diffuser ports located a predetermined distance away from the shoreline.

9. The method of claim 8 which comprises disinfecting said filtrate with chlorine before discharging said filtrate to the sea.

10. The method of claim 9 which comprises introducing from about 0.1 to about 1.0 milligrams per liter of sewage of said polyelectrolyte into said sewage fluid.

11. The method of claim 1 which comprises introducing from about 5 to about 15 milligrams per liter of sewage of said alum composition into said sewage fluid.

12. The method of claim 1 which includes raising the level of dissolved oxygen in said filtrate to a level higher than the level of dissolved oxygen in the surrounding seawater.

* * * * *